United States Patent
Jeon et al.

(10) Patent No.: US 12,499,364 B2
(45) Date of Patent: Dec. 16, 2025

(54) METHOD AND APPARATUS FOR PRUNING BASED ON THE NUMBER OF UPDATES

(71) Applicant: RESEARCH & BUSINESS FOUNDATION SUNGKYUNKWAN UNIVERSITY, Suwon-si (KR)

(72) Inventors: Hee Kwang Jeon, Suwon-si (KR); Jee-Hyong Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1064 days.

(21) Appl. No.: 17/153,087

(22) Filed: Jan. 20, 2021

(65) Prior Publication Data

US 2021/0224655 A1 Jul. 22, 2021

(30) Foreign Application Priority Data

Jan. 20, 2020 (KR) .................. 10-2020-0007533

(51) Int. Cl.
*G06F 17/00* (2019.01)
*G06F 18/214* (2023.01)
*G06N 3/082* (2023.01)

(52) U.S. Cl.
CPC ......... *G06N 3/082* (2013.01); *G06F 18/2148* (2023.01)

(58) Field of Classification Search
CPC .......... G06N 3/082; G06N 3/04; G06N 3/044; G06N 3/045; G06N 3/084; G06F 18/2148
USPC ........................................................ 706/26
See application file for complete search history.

(56) References Cited

U.S. PATENT DOCUMENTS

| | | | |
|---|---|---|---|
| 2017/0337472 A1* | 11/2017 | Durdanovic | G06N 3/045 |
| 2018/0268290 A1* | 9/2018 | Bose | G06N 3/082 |
| 2019/0050734 A1* | 2/2019 | Li | G06N 3/04 |
| 2019/0057308 A1 | 2/2019 | Cho et al. | |
| 2019/0286989 A1* | 9/2019 | Wang | G06F 8/20 |
| 2020/0104717 A1* | 4/2020 | Alistarh | G06N 3/045 |
| 2020/0184333 A1* | 6/2020 | Oh | G06N 3/044 |
| 2020/0311551 A1* | 10/2020 | Aytekin | G06N 3/045 |
| 2020/0410356 A1* | 12/2020 | Kuo | G06F 17/11 |

FOREIGN PATENT DOCUMENTS

KR 10-2019-0018885 A 2/2019

OTHER PUBLICATIONS

Jeon, Heekwang et al., "The Number of Updates Based Weight Pruning", International Convention Center (ICC) Jeju Island, Korea, Dec. 4-7, 2019 (pp. 1-8).
Liu, Congcong, et al., "Channel pruning based on mean gradient for accelerating convolutional neural networks," *Signal Processing*, 156, 2019 (pp. 84-91).
Korean Office Action issued on Sep. 14, 2021 in counterpart Korean Patent Application No. 10-2020-0007533 (6 pages in English).

* cited by examiner

*Primary Examiner* — Jason T Edwards
(74) *Attorney, Agent, or Firm* — NSIP Law

(57) ABSTRACT

Provided are a method and an apparatus for pruning based on the number of updates, the method comprising counting the number of updates of weights for each epoch and removing n weights for which the number of updates is small after training of a network is completed, wherein n represents the number of weights to be removed to satisfy a desired sparsity.

16 Claims, 11 Drawing Sheets

FIG. 6A

5-Dense Layers Network

| Layer | Weights | Pruning |
|---|---|---|
| fc1 | 785K | Pruning |
| fc2 | 1001K | Pruning |
| fc3 | 500K | Pruning |
| fc4 | 100K | Pruning |
| fc5 | 2K | NO |

FIG. 6B

Convolution Neural Network

| Layer | Weights | Pruning |
|---|---|---|
| conv1 | 1K | NO Pruning |
| conv2 | 9K | NO Pruning |
| conv3 | 18K | NO Pruning |
| conv4 | 37K | NO Pruning |
| fc1 | 785K | Pruning |
| fc2 | 1001K | Pruning |
| fc3 | 500K | Pruning |
| fc4 | 100K | Pruning |
| fc5 | 2K | NO Pruning |

(a)

(b)

(a) 1st dense layer    (b) 2nd dense layer    (c) 3rd dense layer    (d) 4th dense layer (e) 1st dense layer    (f) 2nd dense layer    (g) 3rd dense layer    (h) 4th dense layer

METHOD AND APPARATUS FOR PRUNING BASED ON THE NUMBER OF UPDATES

CROSS-REFERENCE TO RELATED APPLICATIONS

This application claims priority to Korean Patent Application No. 10-2020-0007533 filed on Jan. 20, 2020 in Korea, the entire contents of which are hereby incorporated by reference in their entirety.

This application is one of the results of Development project for Next Generation Information Computing Technology, Phase 2, 1/2 (Project No. 2017M3C4A7069440 (2019 Jun. 1-2020 Mar. 31), Project Name: Development for fundamental source technology for self-organization-based autonomous machine learning framework), and Training project for Artificial Intelligence Core Advanced Talent, Phase 1, 2/3 (Project No. 2019-0-00421-002 (2020 Jan. 1-2020 Dec. 31), Project Name: Artificial intelligence graduate school support) hosted by Ministry of Science and ICT (MSIT) in Republic of Korea.

BACKGROUND OF THE DISCLOSURE

Field of the Disclosure

The present disclosure relates to pruning of artificial neural networks.

Related Art

Deep Neural Network (DNN) shows excellent performance in problem solving for a wide range of application fields such as natural language processing and computer vision tasks. In order to increase the accuracy in solving complex problems using a DNN, the DNN model has to be deeper and larger. However, in order to run a large-scale DNN model, a large amount of computational cost and energy consumption are required. In particular, it is very difficult to run a large-scale DNN model in a mobile environment with limited computing and memory resources. To solve the aforementioned problem, compression techniques such as pruning have been proposed.

Pruning is a process of removing weight connections showing a small effect on the accuracy of a network and retraining the network to restore the accuracy. Since large-scale DNNs usually have large internal redundancy, the model size may be reduced without a significant loss of accuracy.

Conventional pruning methods are weight magnitude-based techniques utilizing the magnitude of weights. More specifically, these techniques initialize the weights to random values, train a neural network, compare the magnitude of trained weights, and prune weights with small magnitude to satisfy a desired sparsity. According to the conventional pruning techniques, it is highly likely that weights with a small initial value are pruned. This indicates that those weights the magnitude of which has decreased after a large number of training iterations, namely, a large number of updates, may be pruned first prior to the weights with a large initial value. Since the number of training iterations is different for each weight, large valued weights may not be necessarily more important than small valued weights.

PRIOR ART REFERENCES

Patents (Patent 1) Korean Patent Application Publication No. 10-2019-0018885 ("Method and device for pruning convolutional neural network", SK Hynix Inc., Seoul National University Industry Foundation, Feb. 26, 2019)

SUMMARY

To solve the problem above, an object of the present disclosure is to provide a method for pruning capable of increasing computational speed in an efficient manner while maintaining accuracy of a neural network model and at the same time, reducing the size of the neural network model in an efficient manner by introducing a new criterion that should be considered more preferentially than the magnitude of weights.

To solve the problem above, another object of the present disclosure is to provide an apparatus for pruning capable of increasing computational speed in an efficient manner while maintaining accuracy of a neural network model and at the same time, reducing the size of the neural network model in an efficient manner by introducing a new criterion that should be considered more preferentially than the magnitude of weights.

However, the technical problem to be solved by the present disclosure is not limited to the above but may be extended to other various fields as long as the extension does not depart from the technical principles and domain of the present disclosure.

To solve the problem above, a method for pruning based on the number of updates in a Deep Neural Network (DNN) model according to one embodiment of the present disclosure comprises counting the number of updates of weights for each epoch and removing n weights for which the number of updates is small after training of the network is completed—where n represents the number of weights to be removed to satisfy a desired sparsity.

According to one aspect, the counting the number of updates may include storing weight values after a first epoch is completed; comparing the weight values stored after the first epoch is completed with weight values after a second epoch is completed—the second epoch is an epoch subsequent to the first epoch—and increasing the number of updates by 1 when the weights are turned out to have changed from the comparison result.

According to one aspect, the storing weight values after a first epoch is completed may store the initial values of the weights when the second epoch corresponds to first training.

According to one aspect, the removing weights may remove smaller weights when the numbers of updates are the same.

According to one aspect, the method for pruning may further comprise retraining the DNN model.

According to one aspect, the DNN may be a Convolutional Neural Network (CNN).

To solve the problem above, an apparatus for pruning based on the number of updates in a Deep Neural Network (DNN) model according to another embodiment of the present disclosure comprises a number-of-updates counter counting the number of updates of weights for each epoch and a weight removing unit removing n weights for which the number of updates is small after training of the network is completed—where n represents the number of weights to be removed to satisfy a desired sparsity.

According to one aspect, the number-of-updates counter may store weight values after a first epoch is completed; compare the weight values stored after the first epoch is completed with weight values after a second epoch is completed—the second epoch is an epoch subsequent to the first epoch—and increase the number of updates by 1 when the weights are turned out to have changed from the comparison result.

According to one aspect, the storing weight values after a first epoch is completed may store the initial values of the weights when the second epoch corresponds to first training.

According to one aspect, the weight removing unit may remove smaller weights when the numbers of updates are the same.

According to one aspect, the apparatus for pruning may further comprise a training unit retraining the DNN model.

According to one aspect, the DNN may be a Convolutional Neural Network (CNN).

To solve the problem above, an apparatus for pruning based on the number of updates in a Deep Neural Network (DNN) model according to yet another embodiment of the present disclosure comprises a processor configured to count the number of updates of weights for each epoch and remove n weights for which the number of updates is small after training of the network is completed—where n represents the number of weights to be removed to satisfy a desired sparsity.

The apparatus may further include a memory storing weight values, wherein the counting the number of updates may store weight values after completion of a first epoch in the memory; compare the weight values after completion of the first epoch stored in the memory with weight values after completion of a second epoch—the second epoch is an epoch subsequent to the first epoch—and increase the number of updates by 1 when the weights are turned out to have changed from the comparison result.

According to one aspect, the storing weight values after completion of the first epoch in the memory may store the initial values of the weights in the memory when the second epoch corresponds to first training.

According to one aspect, the processor may remove smaller weights when the numbers of updates are the same.

According to one aspect, the processor may further retrain the DNN model.

According to one aspect, the DNN may be a Convolutional Neural Network (CNN).

To solve the problem above, in a computer-readable storage medium storing a computer program for performing pruning of a Deep Neural Network (DNN) according to still another embodiment of the present disclosure, the computer program includes commands that instructs the computer to count the number of updates of weights for each epoch and remove n weights for which the number of updates is small after training of the network is completed—where n represents the number of weights to be removed to satisfy a desired sparsity.

BRIEF DESCRIPTION OF THE DRAWINGS

FIGS. 6A, 6B, 7, 8, and 9 illustrate experimental results using a method and an apparatus for pruning based on the number of updates according to the embodiments of the present disclosure.

DESCRIPTION OF EXEMPLARY EMBODIMENTS

Since the present disclosure may be modified in various ways and may provide various embodiments, specific embodiments will be depicted in the appended drawings and described in detail with reference to the drawings.

However, it should be understood that the specific embodiments are not intended to limit the gist of the present disclosure to the specific embodiments; rather, it should be understood that the specific embodiments include all of the modifications, equivalents or substitutes belonging to the technical principles and scope of the present disclosure.

Terms such as first or second may be used to describe various constituting elements of the present disclosure, but the constituting elements should not be limited by these terms. Those terms are used only for the purpose of distinguishing one constituting element from the others. For example, a first constituting element may be called a second constituting element without leaving the technical scope of the present disclosure, and similarly, the second constituting element may be called the first constituting element.

If an element is said to be "connected" or "attached" to other element, the former may be connected or attached directly to the other element, but there may be a case in which another element is present between the two elements. On the other hand, if an element is said to be "directly connected" or "directly attached" to other element, it should be understood that there is no other element between the two elements.

Terms used in this document are intended only for describing a specific embodiment and are not intended to limit the technical scope of the present disclosure. A singular expression should be understood to indicate a plural expression unless otherwise explicitly stated. In the present disclosure, the term "include" or "have" is used to indicate existence of an embodied feature, number, step, operation, constituting element, component, or a combination thereof; and should not be understood to preclude the existence or possibility of addition of one or more other features, numbers, steps, operations, constituting elements, components, or a combination thereof.

Unless defined otherwise, all of the terms used in the present disclosure, including technical or scientific terms, provide the same meaning as understood generally by those skilled in the art to which the present disclosure belongs. Those terms defined in ordinary dictionaries should be interpreted to have the same meaning as conveyed by a related technology in the context. Unless otherwise defined explicitly in the present disclosure, those terms should not be interpreted to have ideal or excessively formal meaning.

In what follows, with reference to appended drawings, preferred embodiments of the present disclosure will be described clearly and in detail so that those skilled in the art to which the present disclosure belongs may implement the present disclosure easily.

Figure 1A:
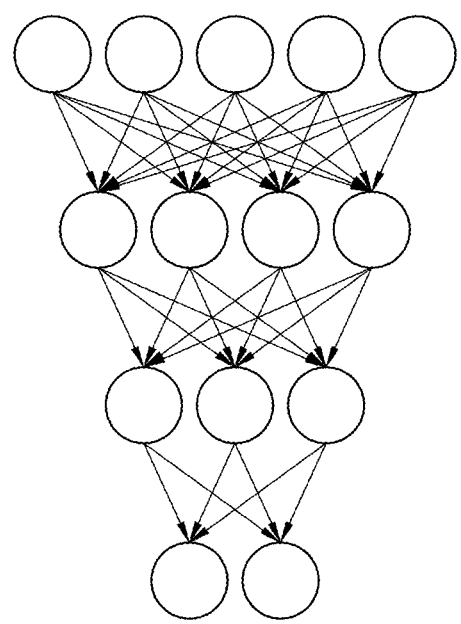
FIGS. 1A and 1B illustrates the concept of pruning.
Figure 1B:
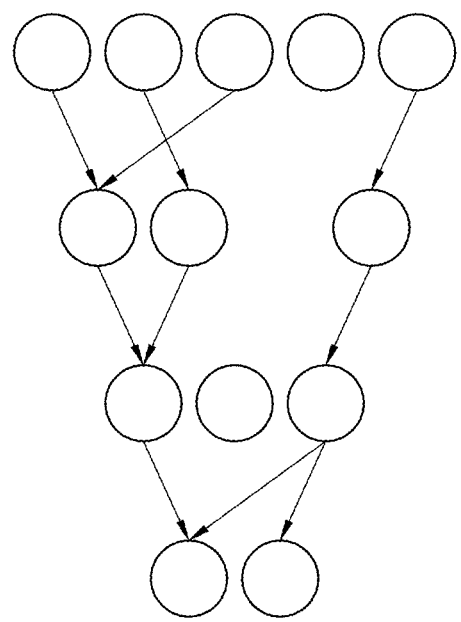

FIGS. 1A and 1B illustrates the concept of pruning.

Pruning is a process of removing weight connections showing a small effect on the accuracy of a network and retraining the network to restore the accuracy. Since large-scale DNNs usually have large internal redundancy, the model size may be reduced without a significant loss of accuracy.

Referring to FIG. 1A, a DNN is composed of a plurality of layers, each layer includes at least one node, and nodes of adjacent layers are connected to each other with weights. Pruning removes nodes or weights constituting the DNN to improve the network performance (namely, computational speed). However, it should be noted that pruning has to be performed in a way to minimize accuracy degradation.

In the example of FIG. 1A, the DNN after pruning is applied may be simplified as shown in FIG. 1B. Before the pruning, the DNN is composed of 14 nodes and 40 weights, but after the pruning, the DNN is simplified to have 12 nodes and 10 weights. Therefore, since running a pruned DNN model requires a smaller amount of computations than the DNN model at its initial state, computational cost and energy consumption may be reduced.

Conventional pruning methods use magnitude (absolute value) of weights as a criterion for determining which to remove from among a large number of nodes and weights. In other words, conventional pruning methods are weight magnitude-based pruning techniques. More specifically, these techniques initialize the weights to random values, train a neural network, compare the magnitude of the trained weights, and prune small-valued weights to satisfy a desired sparsity. According to the conventional pruning techniques, however, it is highly likely that weights with a small initial value are pruned. This indicates that those weights the magnitude of which has decreased after a large number of training iterations, namely, a large number of updates, may be pruned first prior to the weights with a large initial value. Since the number of training iterations is different for each weight, large valued weights may not be necessarily more important than small valued weights.

Figure 2:
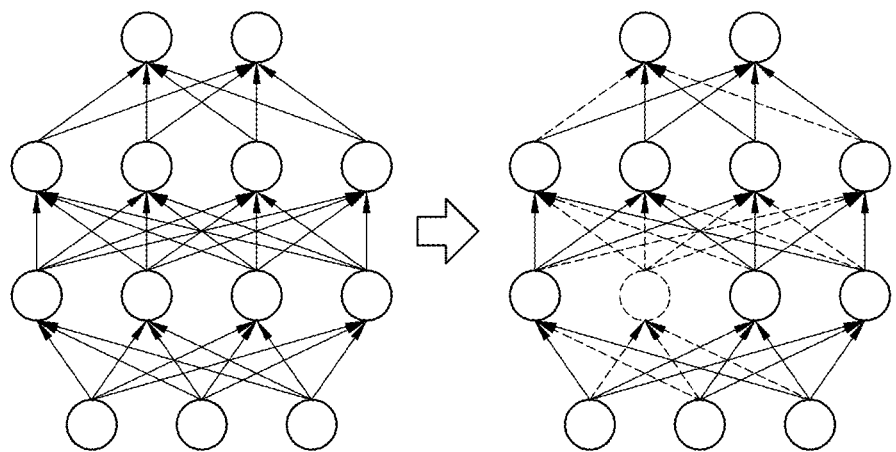
FIG. 2 illustrates a method for pruning based on the number of updates according to one embodiment of the present disclosure.

FIG. 2 illustrates a method for pruning based on the number of updates according to one embodiment of the present disclosure.

Referring to FIG. 2, a method for pruning based on the number of updates according to one embodiment of the present disclosure removes weights based on the number of updates of the weights instead of removing weights based on their magnitude (absolute value) as used in the conventional pruning methods. The method for pruning based on the number of updates according to one embodiment of the present disclosure counts the number of weight updates for each epoch and removes those weights with a small number of updates after training is completed. To this end, instead of a weight matrix each element of which represents the magnitude of a weight as used in the conventional weight magnitude-based pruning methods, a number-of-weight-updates matrix each element of which represents the number of updates of a weight may be used.

The method for pruning based on the number of updates according to one embodiment of the present disclosure may be performed by an apparatus for pruning including a processor and a memory.

Figure 3:
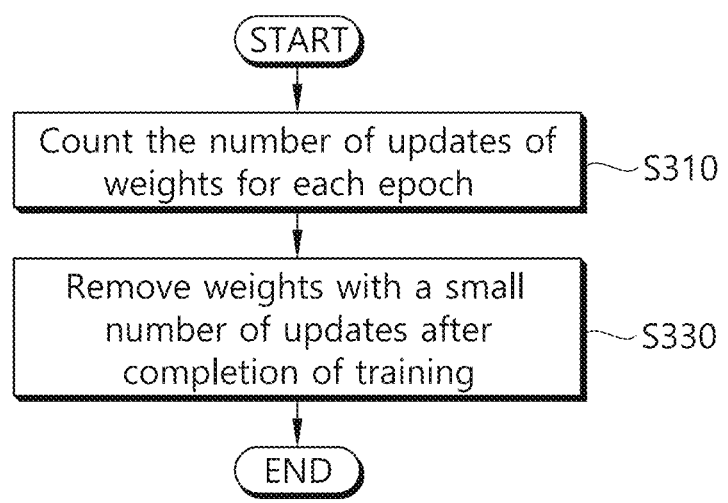
FIG. 3 illustrates a flow diagram of a method for pruning based on the number of updates according to one embodiment of the present disclosure.

FIG. 3 illustrates a flow diagram of a method for pruning based on the number of updates according to one embodiment of the present disclosure.

Referring to FIG. 3, the S310 step counts the number of weight updates for each epoch. In general, the weight value is initialized to a random value before training is started, and each time training is conducted (namely, for each epoch), the weight value is updated to a new one. Those weights used in a training step are updated to new values, but the weights not used in the training step retain their value in the previous epoch without being updated to new one.

For example, counting of the number of updates may be conducted by storing weights before the training step, checking for each epoch whether the weights have changed, and increasing the number of updates by 1 when the weights are turned out to have changed. In other words, weight values are initialized to random values before the training step, weight values after a first epoch is completed are compared with the stored weight values, and the number of updates may be increased by 1 when the weights are turned out to have changed from the comparison. Similarly, from a second epoch on, weight values after completion of a current epoch are compared with the weight values after completion of a previous epoch, and when the weights are turned out to have changed, the number of updates may be increased.

The S330 step removes weights with a small number of updates after completion of training. Here, the weights with a 'small' number of updates indicate the number of weights that have to be removed to satisfy a desired sparsity of pruning when the weights are arranged in an ascending order from the weight with the smallest number of updates. In other words, the weights with a 'small' number of updates refer to lower n (the number of weights that have to be removed to satisfy a desired sparsity) weights in terms of the number of updates.

Meanwhile, for those weights with the same number of updates, weights with smaller magnitude (absolute value) may be removed as in the conventional weight magnitude-based pruning.

Figure 4:
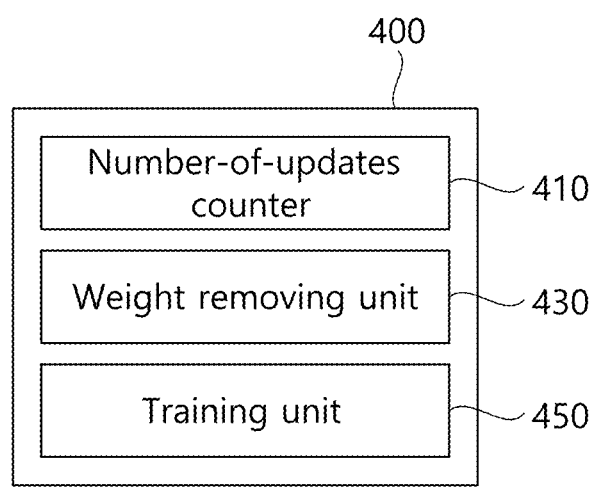
FIG. 4 illustrates an apparatus for pruning based on the number of updates according to another embodiment of the present disclosure.

FIG. 4 illustrates an apparatus for pruning based on the number of updates according to another embodiment of the present disclosure.

Referring to FIG. 4, an apparatus 400 for pruning based on the number of updates according to another embodiment of the present disclosure includes a number-of-updates counter 410 and a weight removing unit 430. Also, the apparatus 400 for pruning may further include a training unit 450.

The number-of-updates counter 410 counts the number of weight updates for each epoch. In general, a weight value is initialized to a random value before training is started, and each time training is conducted (namely, for each epoch), the weight value is updated to a new one. Those weights used in a training step are updated to new values, but the weights not used in the training step retain their value in the previous epoch without being updated to new one.

For example, counting of the number of updates may be conducted by storing weights before the training step, checking for each epoch whether the weights have changed, and increasing the number of updates by 1 when the weights are turned out to have changed. In other words, weight values are initialized to random values before the training step, weight values after a first epoch is completed are compared with the stored weight values, and the number of updates may be increased by 1 when the weights are turned out to have changed from the comparison. Similarly, from a second epoch on, weight values after completion of a current epoch are compared with the weight values after completion of a previous epoch, and when the weights are turned out to have changed, the number of updates may be increased.

The weight removing unit removes weights with a small number of updates after completion of the training. Here, the weights with a 'small' number of updates indicates the number of weights that have to be removed to satisfy a desired sparsity of pruning when the weights are arranged in an ascending order from the weight with the smallest number of updates. In other words, the weights with a 'small' number of updates refer to lower n (the number of weights that have to be removed to satisfy a desired sparsity) weights in terms of the number of updates.

Meanwhile, for those weights with the same number of updates, weights with smaller magnitude (absolute value) may be removed as in the conventional weight magnitude-based pruning.

The training unit 450 retrains a pruned DNN.

Figure 5:
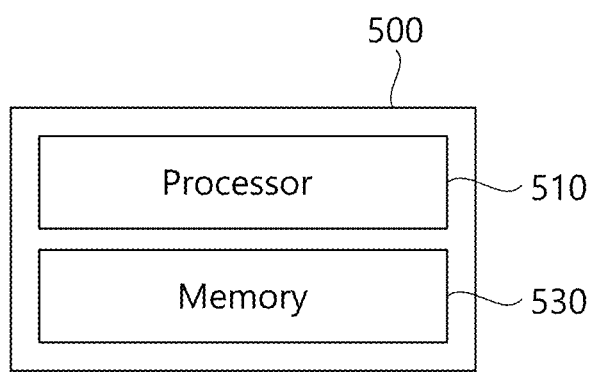
FIG. 5 illustrates an apparatus for pruning based on the number of updates according to yet another embodiment of the present disclosure.

FIG. 5 illustrates an apparatus for pruning based on the number of updates according to yet another embodiment of the present disclosure.

Referring to FIG. 5, an apparatus for pruning 500 based on the number of updates according to yet another embodiment of the present disclosure includes a processor 510 performing pruning and a memory 530 storing weights.

The processor 510 counts the number of weight updates for each epoch and removes n weights—where n represents the number of weights that have to be removed to satisfy a desired sparsity—with a small number of updates after training of a network is completed.

Counting of the number of updates may be conducted by storing weights before the training step in the memory 530, checking for each epoch whether the weights have changed, and increasing the number of updates by 1 when the weights are turned out to have changed. In other words, weight values are initialized to random values before the training step, weight values after a first epoch is completed are compared with the weight values stored in the memory 530, and the number of updates may be increased by 1 when the weights are turned out to have changed from the comparison. Similarly, from a second epoch on, weight values after completion of a current epoch are compared with the weight values after completion of a previous epoch, and when the weights are turned out to have changed, the number of updates may be increased.

Meanwhile, for those weights with the same number of updates, the processor 510 may remove the weights with smaller magnitude (absolute value) as in the conventional weight magnitude-based pruning.

FIGS. 6A, 6B, 7, 8, and 9 illustrate experimental results using a method and an apparatus for pruning based on the number of updates according to the embodiments of the present disclosure.

The experiments were conducted using the MNIST and FMNIST datasets on a 5-dense layer network (see FIG. 6A) and using the CIFAR-10 dataset on a network composed of 4 convolution layers and 5 dense layers (see FIG. 6B); and NVIDIA GTX 1080Ti was employed as the GPU. The conventional weight magnitude-based pruning methods and the method for pruning based on the number of updates according to the embodiments of the present disclosure were conducted respectively, and accuracy according to sparsity was compared.

Figure 7:
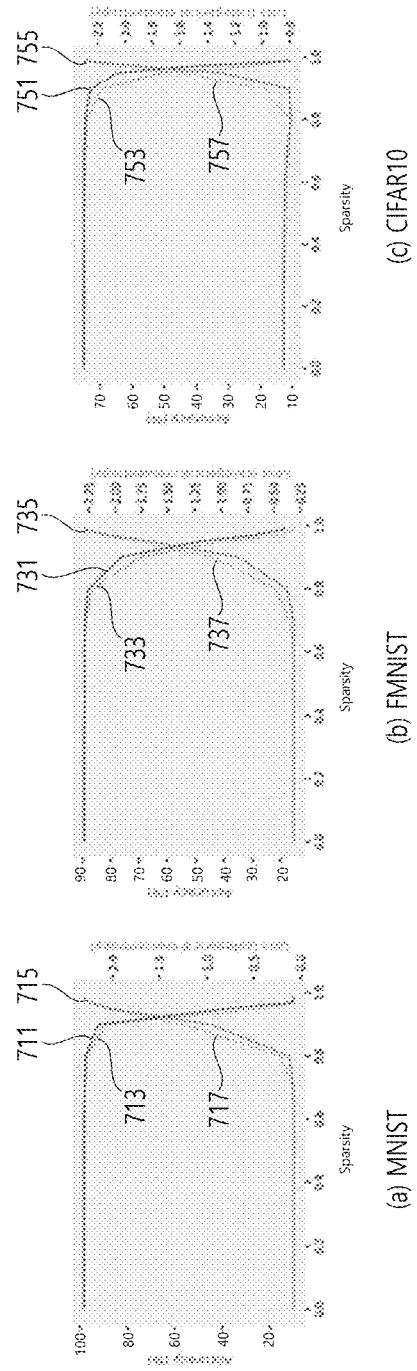

The graphs of (a), (b), and (c) in FIG. 7 show the results obtained by performing pruning on the networks trained using the MNIST, FMNIST, and CIFAR-10 datasets, respectively. In the graphs, reference numbers 711, 731, and 751 represent accuracy according to the sparsity due to pruning based on the number of updates; reference numbers 713, 733, and 753 represent accuracy according to the sparsity due to weight magnitude-based pruning; reference numbers 715, 735, and 755 represent a loss according to the sparsity due to pruning based on the number of updates; and reference numbers 717, 737, and 757 represent a loss according to the sparsity due to weight magnitude-based pruning.

Referring to FIG. 7, pruning based on the number of updates according to the embodiments of the present disclosure provides better accuracy and a smaller loss than the conventional weight magnitude-based pruning. More specifically, pruning based on the number of updates achieved accuracy of 98.2% from the MNIST dataset, 88.5% from the FMNIST dataset, and 84.5% from the CIFAR-10 dataset.

Meanwhile, comparing the graphs in FIG. 7 with each other, it may be noticed that the difference between pruning based on the number of updates and weight magnitude-based pruning becomes greater as the data and the network become more complex.

Figure 8:
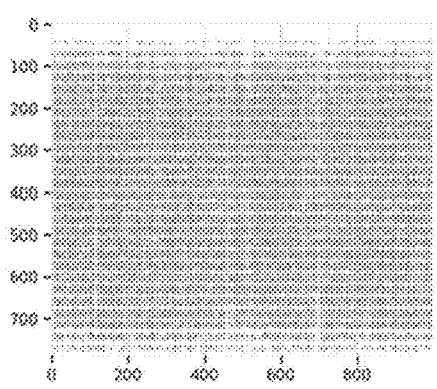
Figure 8:
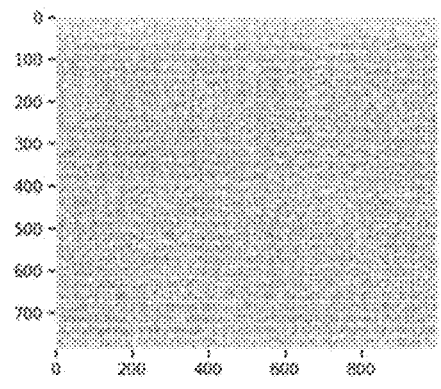

FIG. 8 shows the weights of the first layer of a 5-dense layer network obtained when (a) pruning based on the number of updates and (b) weight magnitude-based pruning are performed on the network after the weights of the network are converged by training on the MNIST dataset. The figure shows that while weights appear to be pruned randomly by the weight magnitude-based pruning, pruning based on the number of updates prunes weights with regularity. This is so because weight magnitude-based pruning is greatly influenced by an initial value of a weight. Also, this result may be interpreted such that some data contributing no influence on the accuracy produce little training effect and associated weights are pruned preferentially.

Figure 9:
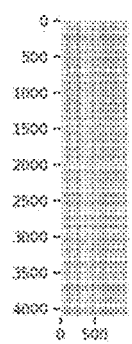
Figure 9:
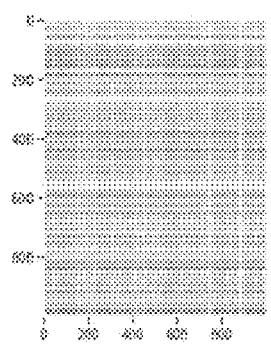
Figure 9:
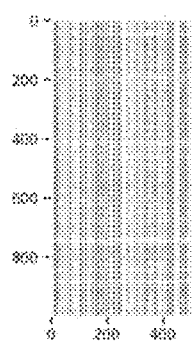
Figure 9:
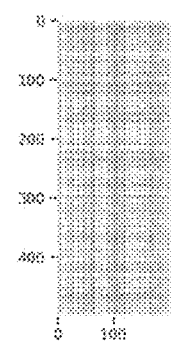
Figure 9:
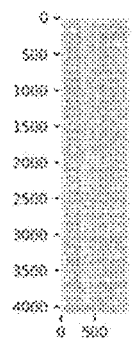
Figure 9:
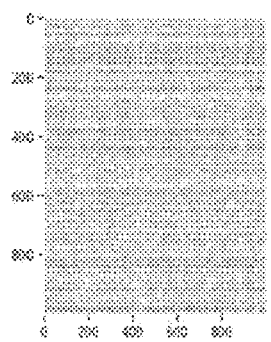
Figure 9:
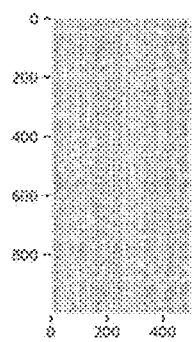
Figure 9:
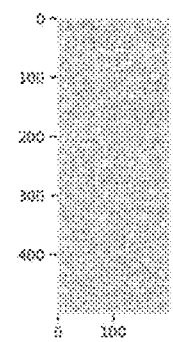

FIG. 9 shows the weights of a fully-connected layer of a convolution network obtained when pruning based on the number of updates (FIGS. 9(a) to (d)) and weight magnitude-based pruning (FIGS. 9(e) to (h)) are performed on the network after the weights of the network are converged by training on the CIFAR-10 dataset. In the same way as shown in FIG. 8, for the case of the convolution neural network, pruning based on the number of updates prunes weights more regularly than the weight magnitude-based pruning.

The method for pruning based on the number of updates according to one embodiment of the present disclosure described above may be implemented in the form of computer-readable code in a computer-readable recording medium. Examples of the computer-readable recording medium include all types of recording media storing data that may be interpreted by a computer system. For example, the recording media may include a Read Only Memory (ROM), a Random Access Memory (RAM), a magnetic tape, a magnetic disk, a flash memory, and an optical data storage device. The computer-readable recording medium may be distributed over computer systems connected to each other through a computer communication network so that computer-readable code may be stored and executed in a distributed manner.

In the above, the present disclosure has been described with reference to appended drawings and embodiments, but the technical scope of the present disclosure is not limited to the drawings or the embodiments. Rather, it should be understood by those skilled in the art to which the present disclosure belongs that the present disclosure may be modified or changed in various ways without departing from the technical principles and scope of the present disclosure defined by the appended claims below.

The present disclosure may provide the following effects. However, since it is not meant that a specific embodiment has to provide all of or only the following effects, the technical scope of the present disclosure should not be regarded as being limited by the specific embodiment.

A method and an apparatus for pruning based on the number of updates according to the embodiments of the present disclosure consider those weights for which the number of updates is small more preferentially and prune the weights first by determining untrained weights to be less important; therefore, computational speed may be increased more efficiently than conventional weight magnitude-based pruning methods while accuracy of a neural network model is maintained, and at the same time, the size of the neural network model may be reduced in an efficient manner.

What is claimed is:

1. A computer-implemented method for pruning based on the number of updates in a Deep Neural Network (DNN) model for reduced memory and computation requirements, the method being performed by at least one processor and comprising:
    counting, using a processor, the number of updates of weights for each epoch and storing the number of updates in a memory;
    removing, using the processor, n weights from the DNN model after training of the model is completed, wherein n represents the number of weights to be removed to satisfy a desired sparsity when the weights are arranged in an ascending order from a weight with a fewest number of updates,
    wherein the counting includes:
        storing weight values in the memory after a first epoch is completed,
        comparing, using the processor, the weight values stored in the memory after the first epoch is completed with weight values after a second epoch is completed, wherein the second epoch is an epoch subsequent to the first epoch, and
        incrementing, using the processor, the number of updates stored in the memory by 1 when a weight value has changed from the comparison result; and
    retraining, using the processor, the DNN model to remove the n weights from the DNN model after the n weights have been removed, wherein the pruning reduces computational overhead and improves performance of the DNN on resource-constrained devices.

2. The method of claim 1, wherein the storing weight values after a first epoch is completed stores the initial values of the weights when the second epoch corresponds to first training.

3. The method of claim 1, wherein the removing weights removes smaller weights when the numbers of updates are the same.

4. The method of claim 1, further comprising retraining the DNN model.

5. The method of claim 1, wherein the DNN is a Convolutional Neural Network (CNN).

6. The method of claim 1, wherein retraining the network DNN model comprises:
    initializing the pruned DNN model with weight values retained from the training phase,
    performing one or more additional training epochs using at least a portion of the original training dataset,
    computing a loss function based on outputs of the pruned model and corresponding ground-truth labels,
    backpropagating the loss to update only the remaining unpruned weights, and
    terminating retraining when a validation accuracy of the model satisfies a predefined convergence criterion.

7. An apparatus for pruning based on the number of updates in a Deep Neural Network (DNN) model for reduced memory and computation requirements, comprising:
    a processor; and
    a memory communicatively coupled to the processor, wherein the processor is configured to:
    count the number of updates of weights for each epoch during training of the DNN model and store the number of updates in a memory;
    store weight values in the memory after a first epoch is completed,
    compare the weight values stored in the memory after the first epoch is completed with weight values after a second epoch is completed, wherein the second epoch is an epoch subsequent to the first epoch, and
    increment the number of updates stored in the memory by 1 when the weights have changed from the comparison result;
    remove n weights from the DNN model after completion of training, wherein n represents the number of weights to be removed to satisfy a desired sparsity, and the n weights are selected in ascending order from weights with a fewest number of updates; and
    retrain the network to remove the n weights from the network after the n weights have been removed,
    wherein the processor and memory are configured to execute the foregoing steps to reduce computational overhead and memory usage during deployment of the DNN model in a resource-constrained environment.

8. The apparatus of claim 7, wherein the processor is further configured to store the initial values of the weights when the second epoch corresponds to a first training.

9. The apparatus of claim 7, wherein the processor is further configured to remove smaller weights when the numbers of updates are the same.

10. The apparatus of claim 7, wherein the processor is further configured to retrain the DNN model.

11. The apparatus of claim 7, wherein the DNN is a Convolutional Neural Network (CNN).

12. An apparatus for pruning based on the number of updates in a Deep Neural Network (DNN) model for reduced memory and computation requirements, the apparatus comprising:
    a processor; and
    a memory communicatively coupled to the processor,
    wherein the processor is configured to:
    store, in the memory, weight values of a DNN model after completion of a first training epoch;
    compare during a second training epoch, the stored weight values from the first epoch with updated weight values from the second epoch, the second epoch being subsequent to the first epoch;
    increment a count value stored in the memory for each weight that has changed based on the comparison, thereby tracking a number of updates per weight;
    repeat the comparison and count incrementing across successive epochs to maintain a cumulative count of updates from each weight in the memory;
    arrange the weights in ascending order in the memory based on their respective number of updates;
    remove n weights having the lowest number of updates after completion of training, wherein n is selected to satisfy a desired sparsity; and
    retain the DNN model to remove the n weights from the DNN model after the n weights have been removed to maintain model accuracy,
    wherein the processor and memory are configured to perform the pruning operation to reduce computational overhead and improve interference performance of the DNN model when deployed on resource-constrained hardware.

13. The apparatus of claim 12, wherein the processor is further configured to store the initial values of the weights in the memory when the second epoch corresponds to a first training.

14. The apparatus of claim 12, wherein the processor is further configured to remove smaller weights when the numbers of updates are the same.

15. The apparatus of claim 12, wherein the processor is further configured to retrain the DNN model.

16. The apparatus of claim 12, wherein the DNN is a Convolutional Neural Network (CNN).

* * * * *